March 19, 1957 J. D' A. CLARK 2,786,005
CROSSCUT WOODY WAFERS AND STRUCTURES EMBODYING SAME
Filed July 26, 1954
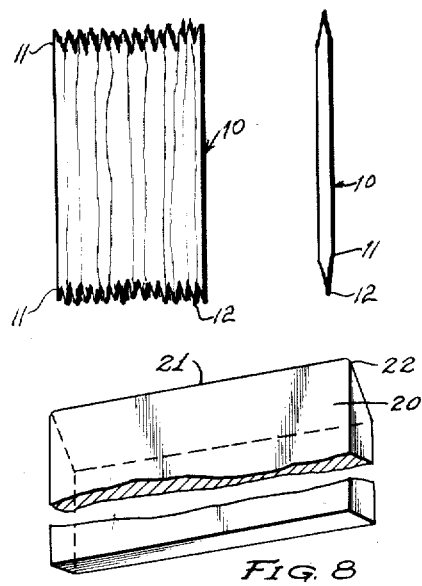
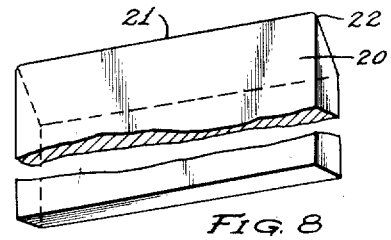
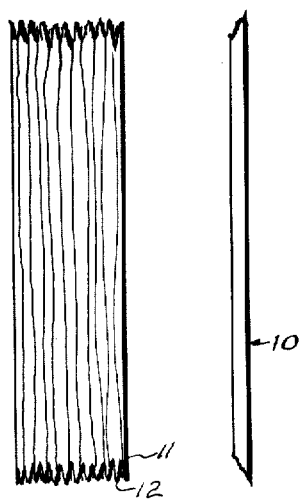
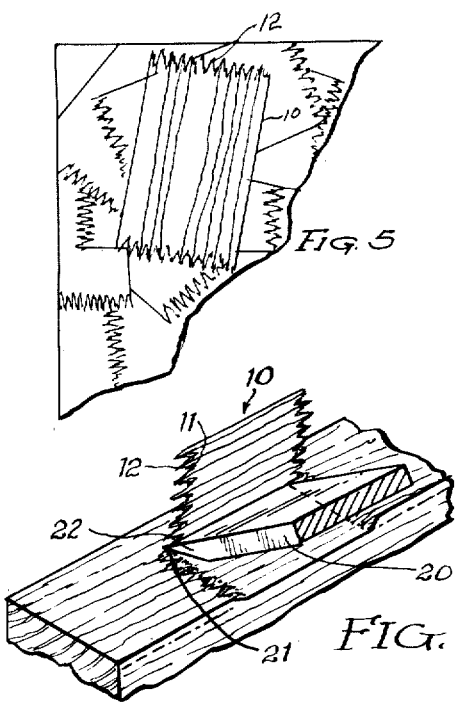
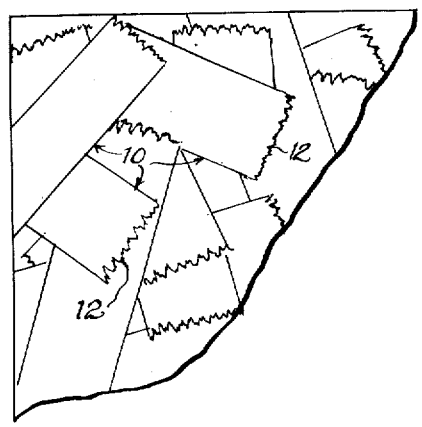
INVENTOR.
James d'A Clark
BY Ooms, McDougall
Williams & Kersh
Atty United States Patent Office 2,786,005
Patented Mar. 19, 1957

2,786,005

CROSSCUT WOODY WAFERS AND STRUCTURES EMBODYING SAME

James D'A. Clark, Longview, Wash., assignor to Changewood Corporation, Chicago, Ill., a corporation of Illinois Application July 26, 1954, Serial No. 445,828

2 Claims. (Cl. 154—45.9)

This invention relates to wafers of woody materials for use in the manufacture of fibrous molded products such as hard boards, panels and the like, and it relates to products which are manufactured thereof and to processes for manufacturing same.

This application is a continuation-in-part of copending applications Ser. No. 344,089, now Patent No. 2,773,789, and Ser. No. 344,088, filed March 23, 1953, Ser. No. 344,088, now abandoned, and which are continuations-in-part of then copending application Ser. No. 192,284, filed October 26, 1950, and Ser. No. 229,375, filed June 1, 1951, respectively, both now abandoned.

It is an object of this invention to produce and to provide a new and expedient method for producing a wafer cut parallel to and across the grain and it is a related object to produce new and improved composite structures embodying same.

These and other objects and advantages will hereinafter appear and for purposes of illustration, but not of limitation, wafers and boards embodying features of this invention are shown in the accompanying drawing, in which—

Figure 1 is a plan view illustrating a woody wafer produced in accordance with the practice of this invention;

Figure 2 is a side elevational view of the wafer shown in Figure 1;

Figure 3 is a plan view of another woody wafer;

Figure 4 is a side elevational view of the wafer shown in Figure 3;

Figure 5 is a fragmentary view of a composite board molded of the wafers of Figure 1;

Figure 6 is a fragmentary view of a composite board molded of the wafers of Figure 3;

Figure 7 is a perspective view of the method for producing wafers embodying features of this invention, and Figure 8 is an enlarged perspective view of a cutter blade employed in the practice of this invention.

In the aforementioned copending applications, description is made of the manufacture of boards and panels by molding wooden wafers which have been severed from a block of wood by positioning the block of wood with a flattened side lying in a position to be cut and then cutting the block in a direction across the direction of the fibers and parallel to the flattened end to produce a crosscut wafer having a thickness depending upon the depth of cut from the flat surface. As defined in the aforementioned applications, the depth of cut may range from 0.002 to 0.015 inch in one instance and from 0.015 to 0.065 inch in the other instance to produce wafers of corresponding thickness. For use in the manufacture of molded boards wherein the fibrous elements are deposited by mechanical means, it is preferred to limit the lengths of the wafers to less than 5 inches.

In accordance with the processes of the aforementioned applications, it is important to form the wafers with tapered ends to minimize the formation of zones of weakness in the final product occasioned by the breaks which occur where the abrupt ends of the wafers fail to blend in with the underlying surfaces. For this purpose, the wafers are cut with end tapers achieved either by scoring the surface of the wooden block with cuts at the desired angle and in the desired spaced relation prior to cross cutting to sever the wafer or by cutting the ends of the wafers at the desired angle after they have been formed to introduce the desired taper therein.

It has been established that the strength properties of boards formed of wafers of the types described are greatly increased when the boards are molded of wafers which have been cut parallel to and across the grain—crosscut—as distinguished from wafers which have been cut parallel to and along the grain—long cut. This increase in the strength properties of the final product is marked, and not contingent on either the contour of the end walls of the wafers or the thicknesses thereof which, although both are important, are secondary factors. The marked improvement in strength seems to flow principally from the lack of injury to the wood fibers in forming the wafers and from the failure to interfere with the natural intrinsic strength of the wood fibers in crosscut wafers as distinguished from the injury to the wood fibers which occurs when the wafers are cut parallel to but along the grain. The injury to the fibers may be traced to a series of fine fractures or nicks which are difficult to see. These lie across the grain and are produced by a long cut wafer curling over the edge of the cutting element as it traverses the face of the wooden block, whereas during cutting, a crosscut wafer is sufficiently flexible in the direction cut to bend sharply over the edge of the cutting element without injury.

It has been established further that the strength properties of a board or panel may be usually increased substantially when the board is molded of crosscut wafers of the type described having the ends cut to a desired taper as distinguished from crosscut wafers having blunt ends. While this concept is true in every instance, it has been found that the marked differences in the strength properties which are secured by the use of crosscut wafers having tapered ends as compared to crosscut wafers having blunt ends diminish when the thicknesses of the wafers used are reduced, as may be illustrated by the following table:

Effect of character of wafers on boards

| Percent Resin Binder | Wafer End | Average Length (inches) | Average Thickness (inches) | Modulus of Rupture (p. s. i.) |
|---|---|---|---|---|
| 1.5 | Blunt | 2.5 | .025 | 7,800 |
| 2.0 | Blunt | 1 | .0205 | 5,600 |
| 1.5 | Taper | 2.5 | .025 | 8,100 |
| 2.0 | Taper | 1 | .021 | 7,900 |
| 5.0 | Blunt | 1 | .004 | 6,600 |
| 5.0 | Taper | 1 | .004 | 6,700 |

At any thickness greater than 0.01 inch, the presence of a taper on the ends is of considerable importance. While improvements in strength properties are to be found when wafers of lesser thickness are employed having an end taper, the differences in such strength properties as compared to wafers having blunt ends are not so pronounced.

Somewhat similarly, it has been found that the effect of tapered ends on the crosscut wafers is dependent also upon the dimension of the wafers in the longitudinal direction, that is, along the grain of the wood. When wafers of increasing lengths are employed, such as illustrated in Figures 3 and 4, the proportion of zones of weakness possible in a lamina of a molded board diminishes to the point where the beneficial effect on strength of wafers having tapered ends becomes less pronounced. While tapered ends are of extreme importance in the use of wafers having a thickness greater than about 0.015 inch and having a length less than about 1½ inches for the development of maximum strength in the molded product, the dependence on tapered ends in the crosscut wafers diminishes when the wafers have a dimension greater than 2 inches but less than 5 inches. A clear correlation exists as between the benefits of tapered ends, the minimum length and the thickness of efficient wafers, since the minimum length of efficient wafers without the tapered ends increases in proportion to the thickness of the wafers. In other words, the thicker the wafer, the greater the minimum length for efficient use without tapered ends. At thicknesses of 0.03 inch, lengths of 2 or more inches are suitable without tapered ends while wafers having a thickness of about 0.02 inch should have a minimum of 1½ inch in length for use without tapered ends, while wafers having a thickness in the range of 0.06 inch may be used without tapered ends at lengths greater than about 3 inches. These relationships are somewhat dependent on the kind and the hardness of the wood. Wafers from a hard strong wood need the taper more than a softer wood, and coniferous woods more than deciduous woods, since the latter are more plastic under the influence of heat.

In any event, the presence of a taper on the ends of the wafers is beneficial for the development of maximum strength in the panels molded therefrom under heat and pressure and tapered ends are of extreme importance in the great majority of fibrous elements which are capable of being handled economically by processing equipment for the manufacture of molded boards by efficient mass production systems embodying unit operations. When used as a facing material besides giving zones of weakness, blunt ends are doubly objectionable because they cause V-shaped furrows at the ends of each, and the thicker the wafer, the deeper the furrow made.

It has now been found that wafers having the desired character for use in the manufacture of molded boards of high strength may be formed very efficiently and economically without cutting the taper in the ends of the wafer in forming but that a desirable taper will form quite naturally when the cutting element used to sever the wafer from the flattened end of the wooden block presents a sharp front cutting edge parallel to the grain with dull corners, as illustrated in Figure 8 of the drawing. When the wafer 10 is severed from the block by crosscutting with an element 20 having a sharp edge 21 and blunt or dull corners 22, the fibrous element is displaced from the surface of the wooden block in a manner which causes the fibers at their ends to be torn out in separation leaving the ends 11 of the element somewhat corrugated in appearance and in which the ends 12 of the hard or summer wood annual rings extend outwardly and which usually taper to sharp points with the softer or spring wood rings indented in between. This construction not only gives the effect of tapered ends, but the pointed projections 12 extending outwardly from the ends of the wafers tend to become more completely integrated with the pointed projections of adjacent wafers or to blend more completely with surfaces of adjacent wafers. The jagged edges which form naturally on the wafers prepared in accordance with this invention also substantially completely eliminate the definite zones of weakness which might be made ordinarily available in straight lines formed with cut end wafers. As a result, products secured with wafers produced in accordance with the practice of this invention provide all of the advantages of tapered end wafers and more from the standpoint of limitations with respect to length and thickness and from the standpoint of appearance. Also it is easier to prepare and maintain the cutting edges in a condition suitable for reducing the wood to wafers than with scalloped knives or additional slasher knives required to produce wafers with uniformly tapered ends.

Thus wafers cut with staggered cutting blades such as described in the aforementioned copending applications and in my other copending application Ser. No. 383,893, but in which the knives are formed with blunt edges, in the manner described are substantially free of the limitations of thickness and length except that it is not practical to make use of wafers having a thickness greater than 0.065 inch except perhaps for structures having a thickness of 1 inch or more or a length greater than about 3 inches—possibly up to 5 inches for thick coarse structures.

A fibrous wafer capable of optimum use in the manufacture of molded products embodying features of this invention may be defined as a crosscut wafer having a thickness ranging from 0.002 to 0.065 inch or a thickness of ⅕ to 1/25 that of the molded structure formed therewith and a length and width as great as possible consistent with means employed to felt the wafers but in which it is preferred to make use of a wafer having a width at least twice the thickness of the wafer, preferably over ten times its thickness and a length at least ten times the thickness and preferably over forty times its thickness. In any event, it is desirable to limit the width and length of the fibers to less than 5 inches and preferably to within the range of 1 to 2½ inches.

In the molded structure that is formed, the wafers lie unoriented with their faces substantially parallel to the faces of the structure and coated substantially over their entire surface with an integrating resinous binder. Excellent molded products have been secured with wafers of the type described having a resinous binder present in amounts as low as ¼ to 1 percent by weight of the final product. Improved strength properties and resistance to water absorption are secured with larger amounts of resinous binder but more than 2 percent by weight binder is seldom required for the central laminae or core of a board. This is to be compared to the conventional use of up to 5–20 percent by weight of binder based upon the fibrous material employed in the manufacture of molded products and laminates of fibrous material.

With wafers produced in accordance with this invention, it is preferred to apply the binder onto the surfaces of the wafer as an impalpable dry powder. When applied in this manner, the amount of resinous binder which will be retained on a surface will seldom exceed 2 percent by weight of the final product unless the wafers are very thin. This will correspond to a coverage of less than 1 pound of resin per 1000 square feet of surface area of the wafers having a thickness of about 0.025 inch. Further increases in dry resin concentration have been found to be incapable of introducing a proportional increase in strength. For example, by doubling the resin concentration from 2 percent to 4 percent using 0.025 inch thick wafers, the molded board is increased only by about 10 percent in its strength properties. It is preferred to calculate the concentration of resinous binder applied with reference to the surface area of the wafers since the amount of resin by weight decreases inversely in proportion with the thickness of the wafers and inversely in proportion to the density of the wood of which they are formed. Under such circumstances, the resinous concentration may be defined as including 0.2 to 2.0 pounds of resinous binder per 1000 square feet of surface area, which is a small fraction of the amount heretofore required to produce molded products of comparable strength, although having greater brittleness.

Application of the resinous binder to wafers for use in the preparation of a molded product by cure under heat and pressure may be secured by a number of techniques. It is preferred to apply the binder as a powdered resin onto the surfaces of the wafers as or before they are tumbled in a rotating mixing drum followed, if desired, by screening or cyclone separation to remove excesses.

Thereafter the wafers may be deposited onto caul sheets or other mold surfaces by mechanical felting machines for molding by heat and pressure into a composite product. In molding, the fibrous layer is usually compressed to about ¼ to ⅙ its original thickness.

As the binder, it is preferred to make use of thermosetting resinous materials such as phenol formaldehyde resin, urea formaldehyde resin, melamine formaldehyde resin, and the like, and to make use of such binders in dry powder form, but it will be understood that such resinous materials may be employed in liquid state and that use may also be made of the thermosetting unsaturated polyesters in the manufacture of low pressure molded products.

It will be understood that the invention herein resides not only in the new and improved fibrous elements that are formed and the method for manufacturing same but also in the composite product which is molded therefrom with the use of a minimum amount of resinous binder to produce a new and improved panel and board having high strength and flexibility. It will be understood further that changes may be made in the details of manufacture and composition without departing from the spirit of the invention, especially as defined in the following claims.

I claim:

1. A crosscut woody wafer adapted for use in the manufacture of a consolidated structure, said wafer having a thickness within the range of about 0.01 inch to 0.065 inch and in which the fibers are substantially parallel to and extend longitudinally of the wafer having its broad faces characterized by freedom of cracks and chips characteristic of wafers cut from woody material parallel to and along the fiber and having a length at least ten times the thickness of the wafer but less than 5 inches and in which the ends of the wafers are tapered and jagged with the jagged portions extending outwardly from the ends corresponding to the summer wood annual rings.

2. A consolidated structure having a lamina consisting essentially of a plurality of crosscut fibrous wafers having a thickness within the range of about 0.01 inch to about 0.065 inch in which the fibers are substantially parallel to and extend longitudinally of the wafer having its broad faces characterized by freedom of cracks and chips which are characteristic of wafers cut of woody material parallel to and along the fiber and having a width at least twice the thickness and a length at least ten times the thickness of the wafer but less than 5 inches and in which the ends of the wafers are tapered and jagged with the jagged portions extending outwardly from the ends corresponding to the summer wood annual rings, and a thermosetting resinous material bonding the wafers one to another to form the lamina in which the resinous binder is present in amounts ranging from 0.1 to 1 pound per 1,000 square feet of surface area of the wafers employed in the manufacture of the lamina.

References Cited in the file of this patent

UNITED STATES PATENTS

| 2,392,844 | Fairchild | Jan. 15, 1946 |
| 2,509,642 | Horsak | May 30, 1950 |
| 2,549,251 | Skelton | Apr. 17, 1951 |
| 2,642,371 | Fahrni | June 16, 1953 |
| 2,686,143 | Fahrni | Aug. 10, 1954 |
| 2,689,092 | Clark et al. | Sept. 14, 1954 |

FOREIGN PATENTS

| 658,524 | Great Britain | Oct. 10, 1951 |

OTHER REFERENCES

Paper Trade Journal, article by A. Elmendorf, publ. Feb. 9, 1950, pages 29–31.

UNITED STATES PATENT OFFICE

Certificate

Patent No. 2,786,005

Patented March 19, 1957

James d'A. Clark

Application having been made jointly by James d'A. Clark, the inventor named in the patent above identified; Consolidated Board Development Company, Chicago, Illinois, a corporation of Delaware, the assignee; and Arthur L. Mottet of Longview, Washington, for the issuance of a certificate under the provisions of Title 35, Section 256 of the United States Code, adding the name of the said Arthur L. Mottet to the patent as a joint inventor, and a showing and proof of facts satisfying the requirements of the said section having been submitted, it is this 5th day of December 1961, certified that the name of the said Arthur L. Mottet is hereby added to the said patent as a joint inventor with the said James d'A. Clark.

[SEAL]

EDWIN L. REYNOLDS,
*First Assistant Commissioner of Patents.*